(12) United States Patent
Aumaugher et al.

(10) Patent No.: US 7,794,805 B2
(45) Date of Patent: Sep. 14, 2010

(54) THERMAL INSULATION BARRIERS

(75) Inventors: Christopher Aumaugher, Houston, TX (US); James Cory, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 525 days.

(21) Appl. No.: 11/771,325

(22) Filed: Jun. 29, 2007

(65) Prior Publication Data
US 2009/0004454 A1 Jan. 1, 2009

(51) Int. Cl.
*B28B 21/72* (2006.01)

(52) U.S. Cl. ............... 428/34.6; 428/34.1; 428/34.4; 428/36.9; 428/36.91; 428/316.6; 428/319.1; 428/69; 428/76

(58) Field of Classification Search ............ 428/76, 428/71, 318.4, 319.1, 319.3, 319.7, 34.1, 428/34.4, 36.9, 36.91, 316.6
See application file for complete search history.

(56) References Cited

U.S. PATENT DOCUMENTS

| | | |
|---|---|---|
| 872,795 A | 12/1907 | Burger |
| 1,497,764 A | 6/1924 | Simonson et al. |
| 2,396,459 A | 3/1946 | Dana |
| 2,643,021 A | 6/1953 | Freedman |
| 2,643,022 A | 6/1953 | Cornell |
| 2,776,776 A | 1/1957 | Strong et al. |
| 1,071,817 A | 9/1958 | Stanley |
| 2,862,106 A | 11/1958 | Scherbatskoy |
| 3,007,596 A | 11/1961 | Matsch |
| 3,038,074 A | 6/1962 | Scherbatskoy |
| 3,265,893 A | 8/1966 | Rabson et al. |
| 3,435,629 A | 4/1969 | Hallenburg |
| 3,481,504 A | 12/1969 | Nelson |
| 4,078,174 A | 3/1978 | Goldman |
| 4,340,405 A | 7/1982 | Steyert, Jr. et al. |
| 4,375,157 A | 3/1983 | Boesen |
| 4,440,219 A | 4/1984 | Engelder |
| 4,513,352 A | 4/1985 | Bennett et al. |
| 4,560,075 A | 12/1985 | Lu |
| 4,722,026 A | 1/1988 | Bennett et al. |
| 5,397,759 A | 3/1995 | Torobin |

(Continued)

FOREIGN PATENT DOCUMENTS

DE 10160640 6/2003

(Continued)

OTHER PUBLICATIONS

J. Creasey, "Aerogels and Applications for Thermal Insulation," Lockheed Martin, ASEN 5519 Project, Fall 1999, England pp. 1-10.

(Continued)

*Primary Examiner*—Hai Vo
(74) *Attorney, Agent, or Firm*—Dave R. Hofman

(57) ABSTRACT

A method for manufacturing an insulation barrier including providing a body having a cavity therein; introducing a plurality of three-dimensional globules into the cavity, with each globule having a radiation reflector component isolated from the exterior of the globule; and closing the cavity to hold the plurality of globules therein. A method for manufacturing an insulation barrier including loading and breaking down an insulation material in a walled space existing between a first tubular disposed within a second tubular.

11 Claims, 5 Drawing Sheets

U.S. PATENT DOCUMENTS

| | | |
|---|---|---|
| 5,500,287 A | 3/1996 | Henderson |
| 5,713,974 A | 2/1998 | Martin et al. |
| 5,901,788 A | 5/1999 | Brown et al. |
| 5,968,618 A | 10/1999 | Miller |
| 6,172,120 B1 | 1/2001 | Smith et al. |
| 6,336,408 B1 | 1/2002 | Parrott et al. |
| 6,341,498 B1 | 1/2002 | DiFoggio |
| 6,614,718 B2 | 9/2003 | Cecconi et al. |
| 6,620,355 B1 | 9/2003 | Schmidt |
| 6,672,093 B2 | 1/2004 | DiFoggio |
| 6,719,947 B1 | 4/2004 | Jha et al. |
| 6,764,667 B1 | 7/2004 | Steiner, III |
| 6,858,280 B2 * | 2/2005 | Allen et al. .................. 428/69 |
| 6,877,332 B2 | 4/2005 | DiFoggio |
| 6,989,123 B2 | 1/2006 | Lee et al. |
| 7,083,009 B2 | 8/2006 | Paluch et al. |
| 7,112,234 B2 | 9/2006 | Jha et al. |
| 7,118,801 B2 | 10/2006 | Ristic-Lehmann et al. |
| 7,226,243 B2 | 6/2007 | LEE et al. |
| 7,226,969 B2 | 6/2007 | Ristic-Lehmann et al. |
| 7,230,543 B2 | 6/2007 | MINTO et al. |
| 2002/0114937 A1 | 8/2002 | Albert et al. |
| 2003/0010041 A1 | 1/2003 | Wessling et al. |
| 2003/0029877 A1 | 2/2003 | Mathur et al. |
| 2003/0115838 A1 | 6/2003 | Rouanet et al. |
| 2003/0234255 A1 | 12/2003 | Hagopian et al. |
| 2005/0028974 A1 | 2/2005 | Moody |
| 2005/0042416 A1 | 2/2005 | Blackmon et al. |
| 2005/0155663 A1 | 7/2005 | Dhellemmes et al. |
| 2005/0208649 A1 | 9/2005 | Ringleb |
| 2005/0211436 A1 | 9/2005 | Fripp et al. |
| 2006/0035054 A1 | 2/2006 | Stepanian et al. |
| 2006/0186125 A1 | 8/2006 | Tew |
| 2006/0196690 A1 | 9/2006 | Ristic-Lehmann et al. |
| 2006/0207673 A1 | 9/2006 | O'Brien et al. |
| 2006/0219724 A1 | 10/2006 | Melnik |
| 2006/0240216 A1 | 10/2006 | Stepanian et al. |
| 2006/0261304 A1 | 11/2006 | Muthukumaran et al. |
| 2007/0095543 A1 | 5/2007 | Tchakarov et al. |

FOREIGN PATENT DOCUMENTS

| | | |
|---|---|---|
| EP | 0012038 | 6/1980 |
| WO | WO 2006102568 A2 * | 9/2006 |

OTHER PUBLICATIONS

J. Fricke, "From Deward to VIPS—One Century of Progress in Vacuum Insulation Technology," 7th International Vacuum Insulation Symposium, Zie Bayern, Wurburg Germany, pp.

J. Matovic, "New Sensors and Instruments for Extreme Conditions," European Network of Excellence 4M, Institute of Sensor and Actuator Systems (ISAS), Vienna Univ. of Tech., Austria [www.em-mitsburg.net./.../2005/sept/28.htm] pp. 1-33.

* cited by examiner

THERMAL INSULATION BARRIERS

BACKGROUND

1. Technical Field

The present invention relates generally to the field of insulation materials and enclosures for thermal isolation. More specifically, but without limitation, the present invention relates to insulation structures with high thermal resistance and mechanical stability.

2. Description of Related Art

Thermal insulation generally refers to materials used to reduce the rate of heat transfer, or the methods and processes used to reduce heat transfer. Many different materials can be used as insulators. Typical properties of insulation materials include high porosity, low conductivity, and low density. Organic insulators may be made from petrochemicals and recycled plastic. Inorganic insulators may be made from recycled materials such as glass and furnace slags. Insulation materials are also produced in various forms and compounds, such as solid, powdered or granular form, fumed silica, layered sheets, aerogels, etc.

Aerogels describe a class of material based upon their structure, namely low density, open cell structures, large surface areas and nanometer scale pore sizes. Aerogels are a solid material derived from gel in which the liquid component of the gel has been replaced with gas. They have nanometer-scale pores. The nano-scale lattice structure and pores create a reduced mean free path for gas molecules thereby reducing energy and mass transport. Aerogels are highly porous, constituting 90% to 99% voidage. Aerogel products are commercially available from companies such as Cabot Corporation™ (information available at www.cabot-corp.com).

The passage of thermal energy through an insulating material occurs via three mechanisms: solid conductivity, gaseous convection, and radiative (infrared) transmission. The sum of these three components gives the total thermal conductivity of the material. Solid conductivity is an intrinsic property of a specific material.

Highly porous bulk or solid materials such as Aerogels are remarkable thermal insulators because they almost nullify the three methods of heat transfer (convection, conduction, and radiation). For dense silica, solid conductivity is relatively high. However, silica aerogels and other highly porous silica based materials possess a very small fraction of solid silica. The solids that are present consist of very small particles linked in a three-dimensional network. Therefore, thermal transport through the solid portion of silica aerogel and these types of materials occurs through a very tortuous path and is not particularly effective. The space not occupied by solids in highly porous materials is normally filled with air (or another gas) unless the material is sealed under vacuum. These gases can also transport thermal energy through the porous material. The other mode of thermal transport through these types of materials involves infrared radiation. Silica aerogels are reasonably transparent in the infrared spectrum. At low temperatures, the radiative component of thermal transport is low, and not a significant problem.

At higher temperatures, however, radiative transport becomes the dominant mode of thermal conduction. Carbon aerogel is a good radiative insulator because carbon absorbs the infrared radiation that transfers heat. Elements with radiation reflective properties (reflectors) are often used to reduce radiative heat transfer. Reflectors may be added or combined with insulating materials to address the issue of radiative heat transport.

Operating thermal insulation systems under vacuum also reduces thermal conductivity. Vacuum insulations are commonplace in various products (such as Thermos bottles). In the case of materials such as aerogels, it is only necessary to reduce the pressure enough to lengthen the mean free path of the gas relative to the mean pore diameter to attain reduced conductivity. Other insulation systems often require a high vacuum to be maintained to achieve the desired performance.

One type of thermal insulating structure known as a Dewar flask has been in use since the late 1800's and has served multiple purposes in many fields. In the field of subsurface and hydrocarbon exploration, Dewar flasks are used differently than the original Dewar. Although they serve the same purpose of insulating the internal contents from external heat, Dewars used in oilfield applications are subjected to much higher temperatures than Dewars used in other areas and they are subject to more restrictive dimensional and physical requirements. Downhole tools are exposed to difficult environmental conditions. The average depth of wells drilled each year becomes deeper and deeper, both on land and offshore. As the wells become deeper, the operating pressures and temperatures become higher. Downhole conditions progressively become more hostile at greater depths. At depths of 5,000 to 10,000 meters, bottom hole temperatures of 260° C. and pressures of 200 Mpa are often encountered. These deep well conditions of high pressure and high temperature damage the external or exposed tool components, and subject the internal electronics to excessive heat.

Conventional Dewar assemblies used in the oilfield industry consist of elongated tubular structures, typically metallic, having a central open bore to house the component(s) to be protected from external heat. U.S. Pat. Nos. 872,795, 1,497,764, 2,643,021, 2,776,776, 3,265,893, 3,481,504, 3,435,629, 4,560,075, 6,336,408, 4,722,026, 4,375,157, 4,440,219, 4,513,352, 2,643,022 and U.S. Patent Application Publication No. 20050208649 describe Dewar-type thermal housings. Dewar flasks used for subsurface or downhole tools are common in wireline applications (See, e.g., U.S. Pat. No. 4,078,174). They are commonly used to protect electronics and other temperature sensitive parts of the equipment from high temperatures encountered within a wellbore.

The use of Dewar flasks for drilling applications is less common because of issues with shock and vibration. During drilling operations, a downhole tool is subjected to high shock and stress on the tool body as the tool is rotated and pressed while traversing through earth formations. Conventional Dewar flasks consist of an outer and inner shell. Contained between the shells is MLI (multi layer insulation) in high vacuum. The multilayer insulation usually consists of a composite of materials including reflectors for radiation such as thin aluminum sheets or metalized films, and fiberglass layers to separate the reflectors. The materials are layered in the annular space with vacuum space in between them. High vacuum in between the layers is used to reduce conduction and convection. U.S. Pat. Nos. 3,038,074, 4,340,305, 3,007,596 describe thermal housings incorporating layered insulation. U.S. Pat. Nos. 6,877,332, 6,672,093, 6,614,718, 6,341,498 and U.S. Patent Application Publication No. 20070095543 describe Dewar assemblies having aerogel composite insulation.

In order to protect the Dewar flasks from shocks and vibration, conventional designs use centralizers to support the inner shell from the outer shell within the assembly. One type of centralizer is sometimes referred to as a wagon wheel. Other centralizer techniques entail the disposal of stainless steel bands on the inner sheet to provide support. There are several problems with using conventional centralizers. One problem is that the centralizer provides a thermal path for the heat to pass from the outer shell to the inner shell, thus reducing the effectiveness of the flask. Another issue with the use of a centralizer is that the inner shell is not fully supported along its length. When the flask is subjected to shock this allows the inner shell to flex, placing additional stress on the assembly and potentially causing fractures leading to the loss of vacuum. Loss of vacuum greatly reduces the effectiveness of the flask. Another common failure caused by shock and vibration is the breakdown of the MLI material. Examination of the insulation structure inside conventional MLI filled Dewar flasks has shown that compressive loading from repeated shocks causes deformation and deterioration of the MLI, resulting in degradation of thermal insulation values, U.S. Pat. Nos. 1,071,817, 2,862,106, 2,396,459 propose using granules and powders as insulating material.

A need remains for improved insulation techniques for use in high temperature and cryogenic environments.

SUMMARY

One aspect of the invention provides a method for manufacture of an insulation barrier. The method includes providing a body having a cavity therein; introducing into the cavity a plurality of three-dimensional globules, each globule having a radiation reflector component isolated from the exterior of the globule; and closing the cavity to hold the plurality of globules therein.

Another aspect of the invention provides an insulation barrier. The barrier includes a body having a cavity therein; a plurality of three-dimensional globules disposed in the cavity, each globule having a radiation reflector component isolated from the exterior of the globule; and the cavity being closed to hold the plurality of globules therein.

Another aspect of the invention provides a method for manufacture of an insulation barrier. The method includes disposing an insulation material within a walled space existing between a tubular assembly consisting of a first tubular disposed within the bore of a second tubular, and breaking down the insulation material in the walled space between the first and second tubular to distribute the material within the space.

BRIEF DESCRIPTION OF THE DRAWINGS

Other aspects and advantages of the invention will become apparent upon reading the following detailed description and upon reference to the drawings in which like elements have been given like numerals and wherein.

DETAILED DESCRIPTION

This disclosure presents advanced thermal insulation/barrier designs. The embodiments disclosed herein may be used in any application or industry where thermal insulation is desired.

Figure 1:
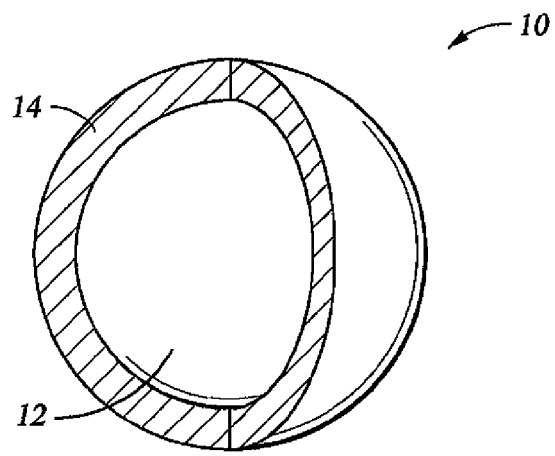
FIG. 1 shows a schematic of a conventional Aerogel particle.
Figure 2:
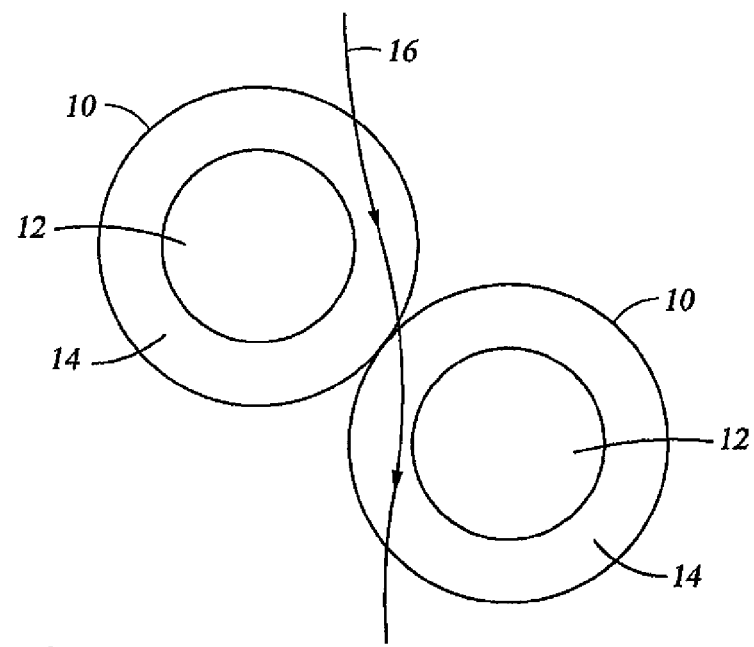
FIG. 2 shows a schematic of a conductive thermal path associated with conventional Aerogel particles.

FIG. 1 shows a conventional Aerogel particle 10 in a spherical configuration. The particle 10 is composed of an aerogel center 12 with an added pacifier/reflector 14 such as Carbon Black to reflect radiation. These configurations are used mainly as a cryogenic insulator. The aerogel 12 is coated with the pacifier 14 and contained within either an ambient or evacuated housing depending on the application and insulation requirements. Most reflectors are thermally conductive. FIG. 2 shows a conductive thermal path 16 created by the reflector-coated aerogel particles 10 when the particles are in contact with one another, as is the case when the particles are contained within an enclosure (not shown) to provide thermal insulation.

Figure 3:
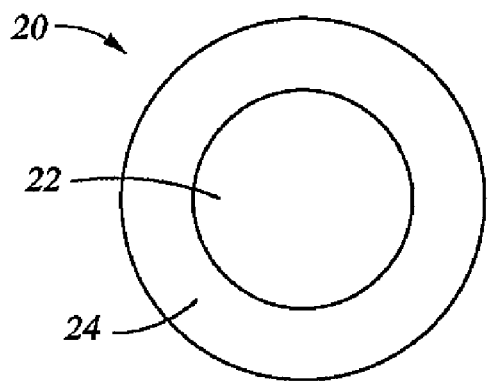
FIG. 3 shows a schematic of a globule in accord with aspects of the invention.
Figure 4:
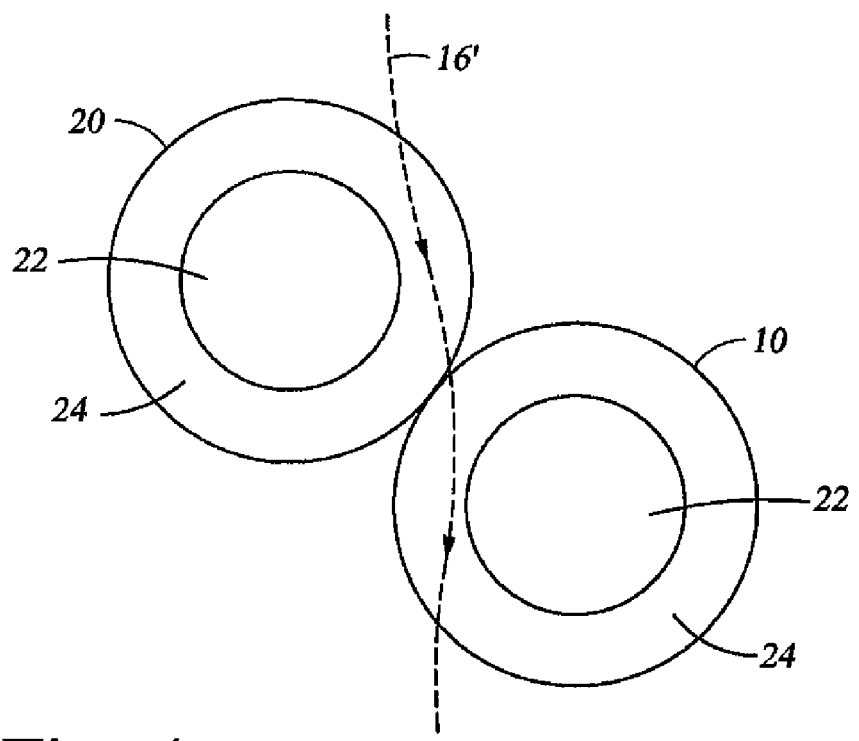
FIG. 4 shows a schematic of conductive thermal path associated with the globules in accord with aspects of the invention.

FIG. 3 shows an aspect of the invention. Several elements are used to form the globules 20 of the invention. For purposes of this disclosure, the term "globule" is understood to comprise a body generally having a rounded shape, for example, a sphere, bead, ball, droplet, or other form of globular body. As shown in FIG. 3, one globule 20 embodiment is formed having a reflector for the nucleus or core 22. It will be appreciated by those skilled in the art that any suitable element(s) or compounds having the desired properties may be used to form the globules 20 of the invention as known in the art. The implementations disclosed herein are not to be limited to any one specific element or compound. For example, the reflector core 22 may be formed using Titanium dioxide or any other suitable element. An insulator 24 component is disposed around the reflector core 22 in the form of a layer. Useable insulators 24 include Aerogels and Silica compounds. The insulator 24 component isolates the reflector component 22 from the exterior of the globule 20. As illustrated in FIG. 4, the insulator 24 laminated globules 20 of the invention provide a reduced thermal pathway 16' for the thermal conduction of the reflectors and increase the proportion of reflectors that can be used without creating thermal paths. By controlling the shape and size of the globules 20 during their formation, one can tailor the individual pathways that will result between the globules when they are in contact with one another. For example, larger size spherically-shaped globules 20 allow for a greater void fraction and larger pores and gaps between globules in a contained globule matrix compared to irregular shaped globules, which allows for better vacuum conduction during manufacture of a sealed insulation barrier (discussed below). Although the globules 20 may be used in reduced pressure and ambient air pressure implementations, lager sized spherically-shaped globules providing increased void fraction and pore sizes will allow a better vacuum to be drawn when implemented within a sealed assembly, providing for improved removal of contaminants and thus reducing convection and conduction losses. Larger size globules 20 are generally also easier to handle, making it easier to fill in small spaces.

Figure 5:
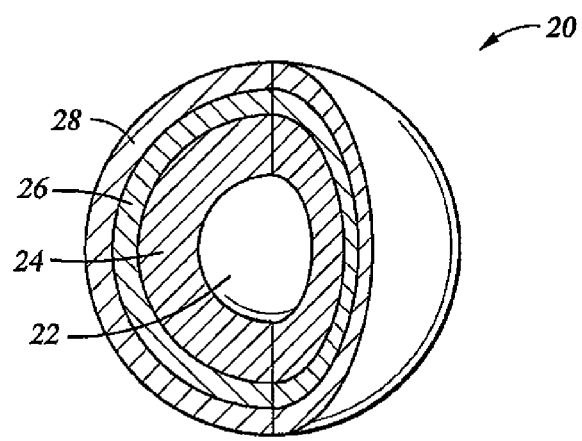
FIG. 5 shows a schematic of a globule in accord with aspects of the invention.

FIG. 5 shows another globule 20 of the invention. In this aspect, a reflector 26 component is further disposed around the insulator 24 (of the globule in FIG. 3) in the form of a layer. Useable reflectors 26 include Carbon Black. Another insulator 28 component is disposed around the reflector 26 component to form a covering layer. Useable insulators 28 include Aerogels and Silica compounds. As illustrated in FIG. 5, the globules 20 of the invention isolate the reflector 22, 26 component(s) from external contact. The amount of reflectors is therefore no longer limited by the conductive heat loss through thermal pathways created by contact between reflector components, which in turn increases the ability of the globule 20 to reflect radiation.

Figure 6:
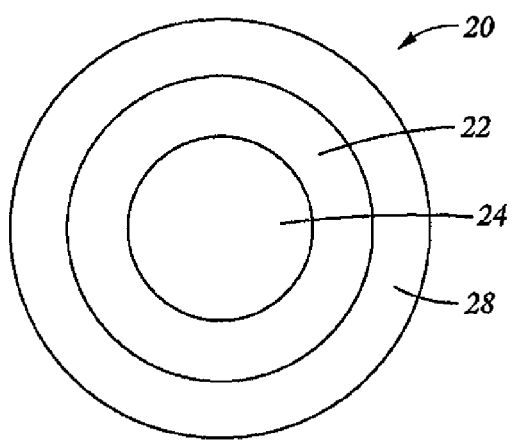
FIG. 6 shows a schematic of another globule in accord with aspects of the invention.

FIG. 6 shows a cross-section of another aspect of a globule 20 formed with an insulator 24 core, surrounded by a reflector 22 component, and further covered by an insulator 28 component. The thickness and distribution of each individual component forming the globules 20 of the invention may be varied to provide the desired property depending on the application. The globules 20 may also be produced using any means known in the art.

Figure 7:
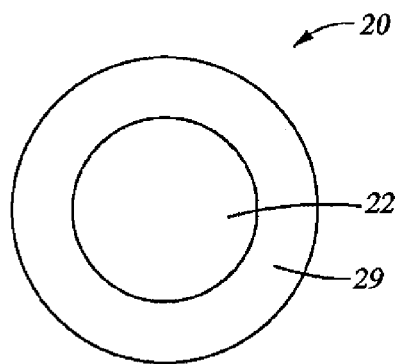
FIG. 7 shows a schematic of another globule in accord with aspects of the invention.

FIG. 7 shows a cross-section of another aspect of a globule 20 formed with a nucleus or core 22 and a sealing 29 component covering the core. The core 22 can comprise the desired component, such as a reflector or insulator material (e.g. Aerogel). In one aspect, the sealing 29 component comprises a glass layer disposed around the 22 core under vacuum. Useable elements for the sealing 29 component include any suitable component providing a gas permeation barrier (e.g., glass, synthetic fluoropolymer (PTFE)). Additional aspects of the globules 20 may be formed with different internal component variations (e.g., as shown in FIG. 5) enclosed by a sealing 29 component disposed under vacuum. In other aspects, the globule 20 can be evacuated or filled with a less conductive gas (e.g. Xenon) and coated with the gas permeation barrier material.

Figure 8:
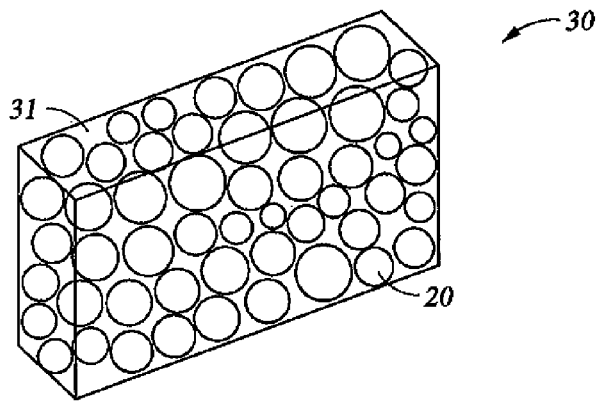
FIG. 8 shows a schematic of an insulation barrier in accord with aspects of the invention.

Turning to FIG. 8, an insulation barrier implementation of the invention is shown. In this aspect, an enclosure body 30 in the form of a rectangular box structure is shown with a walled space or cavity 31 filled with the globules 20 of the invention and sealed to form a thermal barrier. The walls of the enclosure body 30 can be formed of any suitable material and its dimensions can be varied depending on the desired application. For example, an embodiment of the barrier may be implemented as a thin, semi-flexible sheet for use as building wall insulation. Other embodiments may be implemented with an enclosure body 30 fitted with an evacuation port (not shown) to further reduce the barrier's thermal conductivity. Implementation of the globules 20 of the invention is not to be limited to their use with any specific type of vessel or housing. For example, some aspects can be implemented with the globules 20 disposed in the wall of a hose or bellows type vessel, allowing the vessel to remain flexible without damaging or disrupting the thermal insulation value (not shown). Such implementations would be ideal for the conveyance of liquids and gases requiring thermal isolation (e.g., cabling for the transfer of liquefied natural gas).

Figure 9:
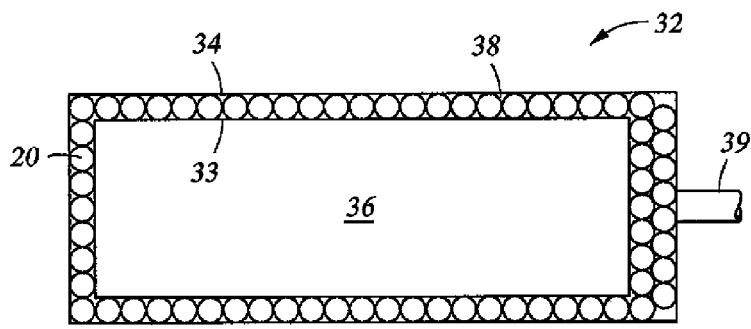
FIG. 9 shows a side view schematic of an insulation barrier in accord with aspects of the invention.

FIG. 9 shows another aspect of the invention. A side view of another insulation barrier 32 is shown implemented as a double-walled tubular body consisting of an elongated inner tubular 33 disposed within an outer tubular 34 to form a configuration with a central bore 36 or payload area. The cavity space 38 between the tubular walls is filled with the globules 20 of the invention. The tubulars 33, 34 are formed from any suitable material (e.g., metal) and the open end(s) may be sealed or capped using any means known in the art (e.g., welding, gluing, threaded caps, etc.). An aspect can be implemented with an optional evacuation port 39 to reduce the pressure within the annular space 38 if desired. As discussed above, the consistence in geometric shape and size provided by the globules 20 provides a consistent density of thermal insulation along the enclosure's body. This consistency assures fewer hot spots due to density variations and better gas (vacuum) conductance. These effects in combination provide an insulation barrier with improved thermal resistance while retaining mechanical support of the inner tubular 33 over the entire length of the body, allowing the enclosure to perform better in a high shock and vibration environment.

In another aspect, the insulation barrier 32 of FIG. 9 can also be implemented with globules 20 disposed within the bore 36 (after insertion of a payload) to fill remaining voids within the bore (not shown). Another aspect can be implemented with the inner tubular 33 including its own evacuation port (not shown) for evacuation of the tubular (with or without a globule fill) prior to insertion within the outer tubular 34. In another aspect, the cavity space 38 between the tubular walls and/or the inner bore 36 may be injected with a gas to provide additional thermal resistance. Useable gases include Xenon, Argon, and other gases depending on the application of the barrier 32. In yet another aspect, other materials may be disposed within the cavity space 38 to further compress the globules (e.g., urethane foam), provided an adequate thermal value is maintained.

Figure 10:
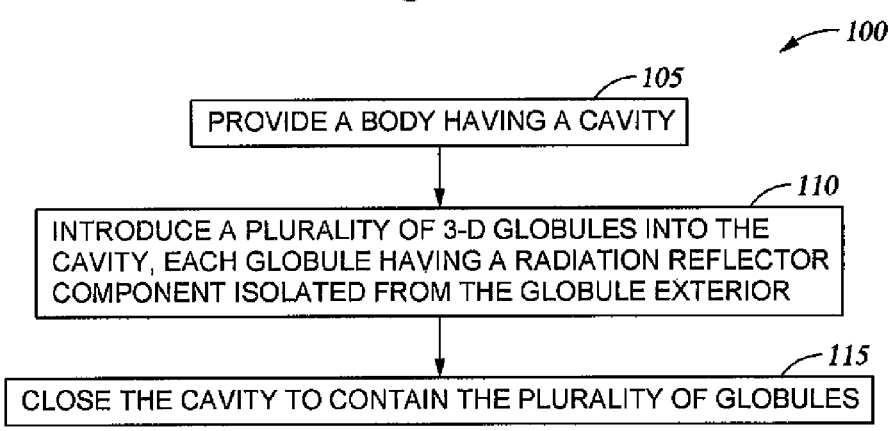
FIG. 10 shows a flow chart of a method for manufacture of an insulation barrier in accord with aspects of the invention.

FIG. 10 shows a flow chart of a method for manufacturing an insulation barrier of the invention. In one aspect, a method 100 includes providing a body having a cavity 105. A plurality of three-dimensional globules, as disclosed herein, is then introduced into the body cavity at step 110. The cavity is then closed to hold the plurality of globules therein at step 115. Additional steps may include any of the aspects disclosed herein as desired, such as evacuation of the cavity, backfilling of the cavity with a less conductive gas, etc.

Figure 11:
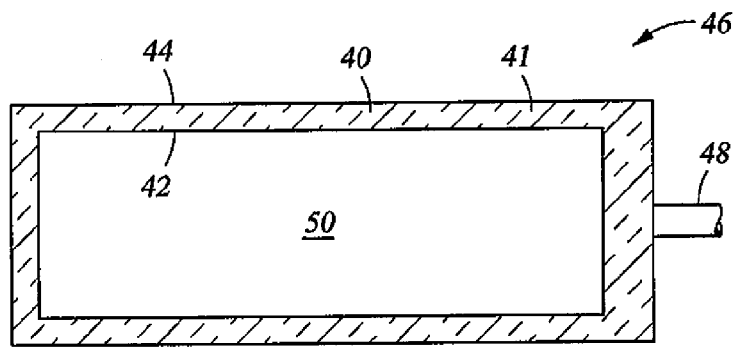
FIG. 11 shows a side view schematic of another insulation barrier in accord with aspects of the invention.

FIG. 11 shows a side view of another aspect of the present invention comprising an insulation barrier implemented with an insulation material 40 disposed in the annular space 41 between a first inner tubular 42 housed within the bore of a second outer tubular 44, similar to the configuration of FIG. 9. Commercially available insulation materials (e.g., aerogels, silica compounds, fumed silica) may be used to implement the tubular barrier assembly 46. The tubulars 42, 44 may be formed from any suitable materials depending on the desired application. Metallic tubulars are preferred for embodiments to be used in subsurface environments. An embodiment of the barrier can be implemented with an optional evacuation port 48 to reduce the pressure in the walled space between the tubulars 42, 44 if desired. Although the barrier may be used in this form to thermally insulate an object place within the bore 50 or payload area of the inner tubular 42, additional benefits are derived by using the barrier assembly 46 in another aspect of the present invention as described below.

Figure 12:
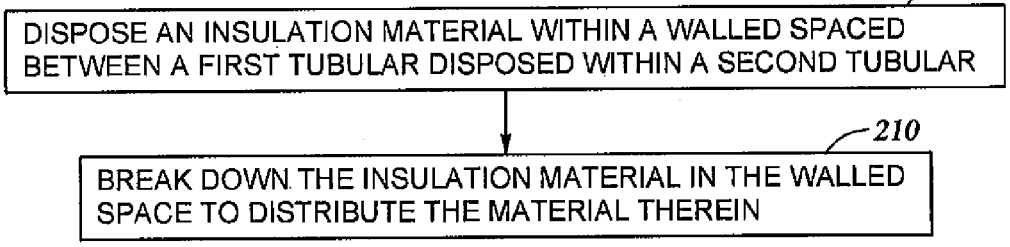
FIG. 12 shows a flow chart of another method for manufacture of an insulation barrier in accord with aspects of the invention.

FIG. 12 shows a flow chart of a method for manufacturing an insulation barrier of the invention. In one aspect, a method 200 entails producing the barrier by disposing an insulation material within the walled annular space between a tubular assembly consisting of a first tubular disposed within the bore of a second tubular (similar to assembly 46 of FIG. 11) at 205. Commercially available insulation materials such as a fumed silica material may be used. In one aspect, insulation material in sheet or strip form may be wrapped around the exterior of a first tubular, such as tubular 42 in FIG. 11. The insulation-wrapped tubular is then inserted within the bore of the second tubular (e.g., 44 in FIG. 11) to form the assembly. The insulation material may be wrapped around the first tubular in one or more sections with sufficient windings to surround the tubular and yet permit insertion of the wrapped tubular into the bore of the larger diameter second tubular. Insulation materials exhibiting fragile/brittle structures (e.g., silica compounds) may be used for aspects of this process. However, the handling of such materials requires a degree of care. One aspect can be implemented using a glass fiber mesh to hold the wrapped insulating material in place during insertion of the inner tubular. Such a mesh could be left within the assembly to provide a desired insulating property. Other implementations can entail the use of adhesives, straps, or other means to provide additional support and protection to the insulation material during insertion of the wrapped inner tubular into the outer tubular. Yet other implementations may be derived using pre-formed annular insulation structures (not shown) that can slide onto or fit as sections around the inner tubular.

At step 210, the insulation material may be broken down and distributed within the walled space between the first and second tubular. The open end(s) of the tubular assembly may be closed or capped to enclose the insulation material within the walled region using any means known in the art (e.g., welding, gluing, threaded caps, etc.). An optional step of evacuating the space between the tubulars via an evacuation port 48 may be taken after closing the assembly if desired. If a glass fiber mesh is used in the assembly as described above, the mesh would allow for increased gas/vacuum conduction. The use of certain insulation materials (e.g., densely compressed silica sheets) in aspects of this process allows for easier evacuation of the walled cavity between the tubulars. In one aspect, the entire closed tubular assembly is subjected to shock and vibration of sufficient intensity to break down the insulation material contained in the space between the tubulars. This mode of breaking down the insulation can be carried out by placing the assembly in a testing apparatus designed to produce controlled shock and vibration motion. If desired, an additional step of evacuating can be carried out after shocking of the assembly. If a glass fiber mesh is used in the assembly as described above, the mesh would break down into non-conductive material and allow for increased gas conduction during evacuation. In another aspect, additional insulation material may be disposed within the walled region after the assembly has been shocked to fill any remaining space, and the shocking/evacuation steps repeated.

Another aspect of the process of FIG. 12 can be implemented by partially or completely fluidizing the insulation material during assembly of the tubular assembly. For purposes of this disclosure, the term "fluidizing" is understood to comprise the making of a multitude of solid particles (e.g. fumed silica powder) behave like a fluid by using an external stimulus (e.g., by vibration, Electro-Magnetic fields, gas flow, etc.). By fluidizing an insulation material such as fumed silica powder, it becomes similar to a fluid and can then be poured in the desired cavity space. Without fluidizing, insulation in powder form is very difficult to pour/insert in narrow or restricted regions. Fluidizing may be accomplished by using any means known in the art. In one aspect, the loose installation material is poured into the outer tube (e.g., tube 44 in FIG. 11) and the material is then fluidized by applying a vibration to the outer tube (not shown). The inner tube (e.g. tube 42) is then pushed down into the fluidized bed leaving the material in the annular region of the assembly. Another aspect can be implemented by moving (e.g., rotating or vibrating) either tubular, or both tubulars, while the insulation material is disposed in the annular region. In another aspect, the shocking technique described above may be combined with a fluidizing technique to dispose the insulation material within the tubular assembly (not shown). In another aspect, the insulation material can be ground down and disposed into the annulus between the tubulars as the assembly is constructed (not shown). Another aspect can be implemented by packing or ramming (e.g., using a ramming tube) the insulation material into the annulus as the tubulars are fitted together (not shown). This technique might be more suitable when using certain types of insulation materials (e.g., densely compressed silica sheets). It will be appreciated by those skilled in the art that other suitable techniques or means may be used to load and break down the insulation material within the spaced regions to produce the disclosed barrier assemblies. Aspects of this process may also include the injection of a gas within the annular space 41 and/or bore 50 as described above.

The disclosed breaking down process provides several advantages over conventional MLI filled Dewar assemblies. The breaking down of the insulation material produces a fragmented or powder-type material providing a high-density uniform distribution of thermal insulation and mechanical support along the length of the assembly, allowing the unit to survive and perform in high shock and vibration environments. The need for add-on centralizers to support the inner tubular is also eliminated.

While the present disclosure described specific aspects of the invention, numerous modifications and variations will become apparent to those skilled in the art after studying the disclosure, including use of equivalent functional and/or structural substitutes for elements described herein. For example, it will be appreciated that the surfaces of the barriers/enclosures of the invention may be polished or finished with materials (e.g., silver) to affect their reflective properties. It will also be appreciated that while aspects are disclosed in relation to use with subsurface implementations, the advantages provided by the disclosed invention (e.g., improved mechanical integrity, light weight, higher efficiency, vacuum and ambient air pressure application) make it suitable for other applications such as space travel vehicles, underwater implementations, building construction, power generation, etc. All such similar variations apparent to those skilled in the art are deemed to be within the scope of the invention as defined by the appended claims.

What is claimed is:

1. An apparatus, comprising:
    an outer tubular;
    an inner tubular disposed within the outer tubular such that an annular space is formed between the inner tubular and the outer tubular; and
    a plurality of three-dimensional globules disposed within the annular space, wherein each of the globules comprises:
    a central core comprising a radiation reflector material, wherein the radiation reflector material comprises titanium dioxide; and
    a layer comprising an insulator material isolating the central core from an exterior of the globule, wherein the insulator material comprises an aerogel compound.

2. The apparatus of claim 1 wherein the annular space is closed to hold the plurality of globules therein.

3. The apparatus of claim 2 wherein pressure in the annular space is reduced relative to pressure outside the outer tubular.

4. The apparatus of claim 1 wherein the insulator material comprises a silica compound.

5. The apparatus of claim 1 wherein the annular space further comprises a gas.

6. The apparatus of claim 1 wherein each of the globules further comprises an outer layer comprising a sealant.

7. The apparatus of claim 6 wherein the sealant comprises glass.

8. The apparatus of claim 6 wherein the sealant comprises PTFE.

9. The apparatus of claim 1 wherein the radiation reflector material is a first radiation reflector material, wherein the layer is a first layer, and wherein each of the globules further comprises:
   a second layer surrounding the first layer and comprising a second radiation reflector material; and
   a third layer surrounding the second layer and comprising the insulator material.

10. The apparatus of claim 9 wherein the second radiation reflector material comprises carbon black.

11. An apparatus, comprising:
    an outer tubular;
    an inner tubular disposed within the outer tubular such that an annular space is formed between the inner tubular and the outer tubular; and
    a plurality of three-dimensional globules disposed within the annular space, wherein each of the globules comprises:
       a central core comprising a first radiation reflector material, wherein the first radiation reflector material comprises titanium dioxide;
       a first layer surrounding the central core and comprising an insulator material, wherein the insulator material comprises an aerogel compound;
       a second layer surrounding the first layer and comprising a second radiation reflector material, wherein the second radiation reflector material comprises carbon black;
       a third layer surrounding the second layer and comprising the insulator material; and
       an outer layer comprising a sealant, wherein the sealant comprises glass or PTFE.

* * * * *